(12) United States Patent
Maeda et al.

(10) Patent No.: US 9,435,308 B2
(45) Date of Patent: Sep. 6, 2016

(54) FUEL INJECTION VALVE, INTERNAL COMBUSTION ENGINE AND FUEL INJECTION METHOD

(75) Inventors: Kaoru Maeda, Yokohama (JP); Yuichiro Goto, Yokohama (JP); Wolfram Wiese, Baden-Wuerttemberg (DE); Daniel Scherrer, Yokohama (JP)

(73) Assignee: Bosch Corporation, Tokyo (JP)

( * ) Notice: Subject to any disclaimer, the term of this patent is extended or adjusted under 35 U.S.C. 154(b) by 210 days.

(21) Appl. No.: 14/232,044

(22) PCT Filed: Jul. 4, 2012

(86) PCT No.: PCT/JP2012/067077
§ 371 (c)(1),
(2), (4) Date: Jan. 10, 2014

(87) PCT Pub. No.: WO2013/008692
PCT Pub. Date: Jan. 17, 2013

(65) Prior Publication Data
US 2014/0130772 A1 May 15, 2014

(30) Foreign Application Priority Data

Jul. 11, 2011 (JP) ................................. 2011-152979

(51) Int. Cl.
*F02B 23/10* (2006.01)
*F02M 61/18* (2006.01)

(52) U.S. Cl.
CPC ........ *F02M 61/1806* (2013.01); *F02B 23/101* (2013.01); *F02B 23/104* (2013.01);
(Continued)

(58) Field of Classification Search
CPC .. F02B 23/101; F02B 23/104; F02B 23/103; F02B 23/0651; F02B 23/0699; F02B 2023/103; F02B 2023/102; F02B 2023/106; F02B 2023/107; F02M 61/1806; F02M 61/1813; F02M 61/1826; F02M 61/1833; F02M 61/1846; F02M 61/188
See application file for complete search history.

(56) References Cited

U.S. PATENT DOCUMENTS

| 6,334,427 B1 * | 1/2002 | Nakayama ............ F02B 23/104 123/298 |
| 7,082,921 B2 * | 8/2006 | Shimizu ................ F02B 23/104 123/298 |

(Continued)

FOREIGN PATENT DOCUMENTS

| JP | 2004232583 | 8/2004 |
| JP | 2005248857 | 9/2005 |

(Continued)

OTHER PUBLICATIONS

International Search Report for Application No. PCT/JP2012/067077 dated Aug. 21, 2012 (English Translation, 2 pages).

*Primary Examiner* — Hung Q Nguyen
*Assistant Examiner* — George Jin
(74) *Attorney, Agent, or Firm* — Michael Best & Friedrich LLP

(57) ABSTRACT

It is an object of the present invention to reduce the penetration of a fuel spray directed toward a certain area in a cylinder, thereby reducing oil dilution that increases sliding resistance in the engine, reducing fuel adhesion or the like onto the cylinder liner, and also reducing the adverse effect of a fuel spray having an increased penetration.
A fuel injection valve that has a plurality of injection holes and injects fuel into a cylinder 3 of an internal combustion engine includes: injection holes a2 and a6 having a larger diameter for injecting fuel toward a ring-shaped space T1 including areas A2 and A6 of strong tumble flow T formed in the cylinder; and injection holes a1, a4, a3 and a5 having a smaller diameter for injecting fuel toward a space including areas A1, A4, A3 and A5 of weak tumble flow formed in the cylinder 3. A fuel spray from an injection hole having the larger diameter has a penetration force to the tumble flow larger than the penetration force of a fuel spray from an injection hole having the smaller diameter.

18 Claims, 7 Drawing Sheets

(52) U.S. Cl.
CPC ..... *F02M61/1813* (2013.01); *F02M 61/1826* (2013.01); *F02B 2023/103* (2013.01); *F02B 2023/106* (2013.01); *F02B 2275/48* (2013.01); *Y02T 10/125* (2013.01)

(56) References Cited

U.S. PATENT DOCUMENTS

| | | | | |
|---|---|---|---|---|
| 2002/0185104 | A1* | 12/2002 | Arndt | F02B 23/104 123/299 |
| 2006/0191511 | A1* | 8/2006 | Mifuji | F02M 61/162 123/305 |
| 2006/0219216 | A1 | 10/2006 | Sukegawa et al. | |
| 2006/0260581 | A1* | 11/2006 | Yoshimoto | F02B 17/005 123/143 B |
| 2008/0196691 | A1* | 8/2008 | Kihara | F02B 23/104 123/299 |
| 2009/0235897 | A1* | 9/2009 | Fujikawa | F02B 23/104 123/305 |
| 2009/0242670 | A1* | 10/2009 | Kato | F02M 51/0671 239/584 |
| 2014/0069393 | A1* | 3/2014 | Yarino | F02B 23/104 123/478 |
| 2015/0204292 | A1* | 7/2015 | Kaden | F02M 69/045 123/294 |

FOREIGN PATENT DOCUMENTS

| | | |
|---|---|---|
| JP | 2008051075 | 3/2008 |
| JP | 2008267318 | 11/2008 |
| JP | 2009209789 | 9/2009 |
| JP | 2009228582 | 10/2009 |
| WO | 2006/025114 | 9/2006 |
| WO | 2008/015536 | 2/2008 |

* cited by examiner (a)

(b)

(c)

FUEL INJECTION VALVE, INTERNAL COMBUSTION ENGINE AND FUEL INJECTION METHOD

BACKGROUND OF THE INVENTION

The present invention relates to a fuel injection valve including injection holes having different diameters, an internal combustion engine including the fuel injection valve and a fuel injection method using the fuel injection valve.

A fuel injection valve used for a typical gasoline engine has a plurality of injection holes. The plurality of injection holes formed in one fuel injection valve have the same diameter. Penetrations of fuel sprays against the air flow in a cylinder depend on the momentum of the fuel sprays from the individual injection holes, and, since the fuel sprays from the same type of injection holes have the same momentum, the penetrations of the individual fuel sprays are the same. Note that a penetration refers to a fuel spray travel distance, however, does not necessarily refers to a final fuel spray travel distance, but often refers to a fuel spray travel distance at a certain point of time. Mentioning the relation between penetration and penetration force, a penetration is a fuel spray travel distance, and the travel distance is determined from the penetration force (or initial spray momentum) decelerated by a surrounding fluid, so there is a strong correlation between the penetration force and the penetration.

In contrast, JP-A-2004-232583 discloses a fuel injection valve in an internal combustion engine that injects fuel into a cavity unsymmetrically. As shown in FIG. 3 in the disclosure, the multi-hole injection valve includes a plurality of injection holes having different diameters in which a larger number of injection holes having a larger diameter are directed toward the intake side, while a smaller number of injection holes having a smaller diameter are directed toward the exhaust side. Furthermore, this fuel injection valve is in a center-mount configuration, i.e., is positioned in the center of a cylinder head.

Furthermore, in an internal combustion engine according to JP-A-2004-232583, fuel is injected unsymmetrically between the intake side and the exhaust side in the cylinder according to tumble flow that is unsymmetrical between the intake side and the exhaust side in an attempt to generate a more homogeneous fuel-air mixture by the action of tumble flow (see paragraph [0019]).

SUMMARY OF THE INVENTION

In the above-described typical fuel injection valve, fuel is sprayed from the plurality of injection holes with the same penetration toward the areas in the cylinder. So, among fuel sprays traveling toward the cylinder liner on the inner side surface of the cylinder and toward the piston crown surface on the inner bottom surface of the cylinder, some fuel sprays may penetrate an area of weak tumble flow to reach the cylinder liner or the piston crown surface. Such a fuel spray may cause oil dilution that increases sliding resistance in the engine, fuel adhesion onto the cylinder liner and fuel adhesion onto the piston crown surface relating to soot emission. Note that reducing the flow rate of the injection holes in order to reduce the penetration of the fuel sprays reaching the cylinder liner or the piston crown surface may cause a shortage of overall injection amount per one combustion, resulting in an insufficient torque or increase in emission amount of $NO_x$.

More specific description is given with reference to FIG. 1. Considering the layout of an internal combustion engine such as a direct-injection engine, when, in a side-mount configuration in which a fuel injection valve 11b is positioned as shown in FIG. 1, the spray direction from the fuel injection valve 11b is more upwardly directed or when, in a center-mount configuration in which a fuel injection valve 11a is positioned as shown in FIG. 1, the angle against one side wall is set to be larger, fuel adhesion onto the cylinder liner on the inner side surface of the cylinder increases to further increase engine oil dilution.

When, in the side-mount configuration, the spray direction from the fuel injection valve 11b is more downwardly directed or when, in the center-mount configuration, the angle against the piston sliding direction is set to be smaller, fuel adhesion onto the piston crown surface increases to form a fuel-air mixture having a dense fuel concentration near the wall surface, thereby increasing soot emission amount due to incomplete combustion, which are considered to be a trade-off relationship. Furthermore, even when the penetrations can be controlled by changing the injection hole diameters, for some fuel sprays, their penetrations may be reduced, while, for other fuel sprays, their penetrations needs to be increased in order to maintain constant a fuel amount per one combustion, which are considered to be under the same trade-off relationship.

Furthermore, JP-A-2004-232583 is not intended to reduce the adverse effect of a fuel spray having a strong penetration, so it cannot solve the above problem.

It is an object of the present invention to reduce the penetration of a fuel spray directed toward a certain area (a cylinder liner and a piston crown surface) in a cylinder, thereby reducing oil dilution that increases sliding resistance in the engine, reducing fuel adhesion or the like onto the cylinder liner and the piston crown surface, and also reducing the adverse effect of a fuel spray having an increased penetration.

In order to solve the above problem, according to the invention, a fuel injection valve that has a plurality of injection holes and injects fuel into a cylinder of an internal combustion engine includes: a first group of injection holes for injecting fuel toward a ring-shaped space including an area of strong tumble flow formed in the cylinder; and a second group of injection holes for injecting fuel toward a space including an area of weak tumble flow formed in the cylinder, wherein a fuel spray with the smallest penetration force from the first group of injection holes has a penetration force larger than a fuel spray with the largest penetration force from the second group of injection holes.

The first group of injection holes includes an injection hole having an injection center axis line having a minimum angle with a circular plane including a ring of the space. The second group of injection holes includes an injection hole having an injection center axis line having a maximum angle with a circular plane including a ring of the space. The smallest injection hole of the first group of injection holes has a diameter larger than that of the largest injection hole of the second group of injection holes. A plurality of the spaces are formed, and the second group of injection holes inject fuel toward an space of weak tumble flow formed between and/or outside the plurality of spaces. The second group of injection holes includes an injection hole having an injection center axis line having a maximum angle with a circular plane including a ring of the space. The second group of injection holes includes an injection hole having an injection center axis line having a minimum angle with a circular plane including a ring of the space.

The second group of injection holes includes an injection hole having an injection center axis line having a maximum angle with a circular plane including a ring of the space. The second group of injection holes includes an injection hole having an injection center axis line having a minimum angle with a circular plane including a ring of the space. In order to maintain constant the total injection amount of the fuel injection valve, the increase or decrease in the total injection amount of the fuel injection valve calculated by combining the increase or decrease in the injection amount of all of the injection holes is zero. The internal combustion engine includes the fuel injection valve.

Furthermore, according to the invention, A fuel injection method for injecting fuel into a cylinder of an internal combustion engine includes: a first injection step for injecting fuel from a first group of injection holes toward a space including an area of strong tumble flow formed in the cylinder; and a second injection step for injecting fuel from a second group of injection holes toward a space including an area of weak tumble flow formed in the cylinder, wherein a fuel spray with the smallest penetration force from the first group of injection holes has a penetration force larger than a fuel spray with the largest penetration force from the second group of injection holes. In the fuel injection method, the first injection step and the second injection step are performed at the same time. In the fuel injection method, a plurality of the spaces are formed, and the second group of injection holes inject fuel toward an space of weak tumble flow formed between and/or outside the plurality of spaces. The second group of injection holes includes an injection hole having an injection center axis line having a maximum angle with a circular plane including a ring of the space. The second group of injection holes includes an injection hole having an injection center axis line having a minimum angle with a circular plane including a ring of the space.

According to the device and method of the invention, reducing the penetration of a fuel spray directed toward a certain area (a cylinder liner and a piston crown surface) in a cylinder can reduce oil dilution and reduce fuel adhesion or the like onto the cylinder liner and the piston crown surface, and also direct a fuel spray having an increased penetration toward an area of high air fluidity, thereby maintaining constant the total injection amount to appropriately control combustion efficiency.

DETAILED DESCRIPTION

An embodiment relating to a fuel injection valve of the present invention, an internal combustion engine including the fuel injection valve and a fuel injection method using the fuel injection valve is described below with reference to the drawings.

In the embodiment of the invention, in one fuel injection valve, diameters of a plurality of injection holes directed toward a certain area are varied to vary the injection amount for each injection hole to enable the penetrations to be controlled. However, since the total injection amount of one fuel injection valve needs to be maintained constant, a first group of injection holes of which penetrations (penetration forces) are increased and a second group of injection holes of which penetrations (penetration forces) are reduced are provided.

Figure 1:
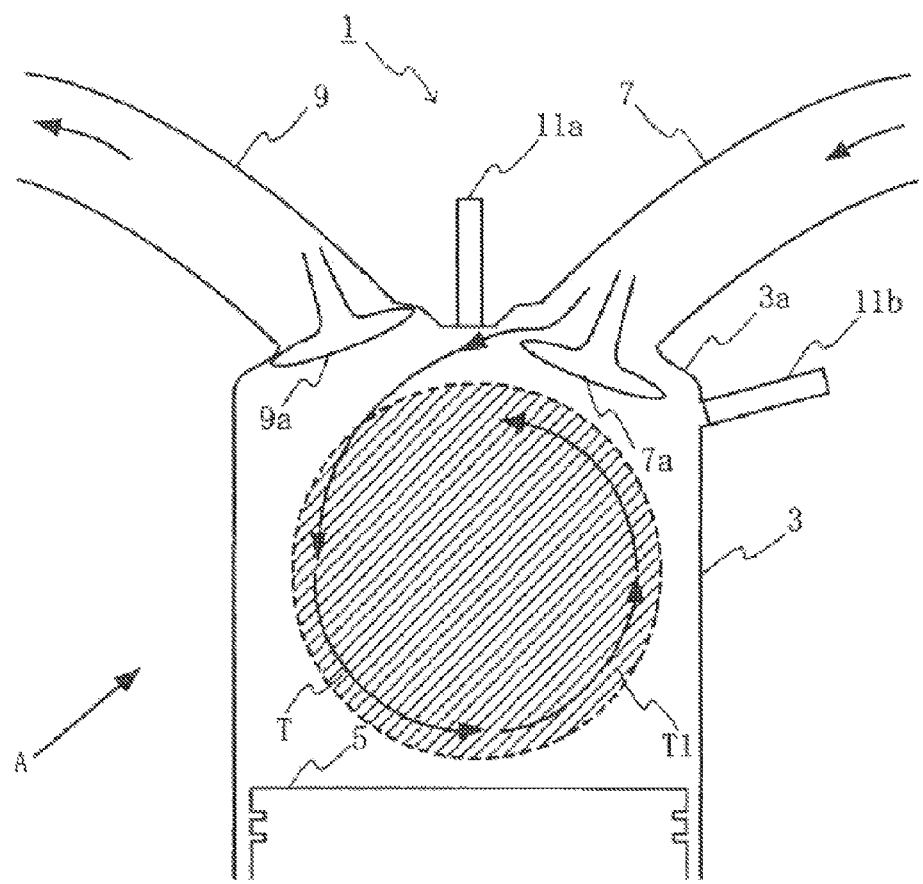
FIG. 1 is a schematic diagram of an internal combustion engine to which the embodiment is to be applied.

FIG. 1 shows a conceptual diagram of an internal combustion engine 1 to which the embodiment is to be applied. The internal combustion engine 1 includes: a cylinder 3; a piston 5 provided in the cylinder; a plurality of intake manifolds 7 connected to a cylinder head 3a for intaking air into the cylinder 3; a plurality of intake valves 7a for opening and closing the plurality of intake manifolds 7 to control air-intaking; a plurality of exhaust manifolds 9 connected to the cylinder head 3a for exhausting air from the cylinder 3; and a plurality of exhaust valves 9a for opening and closing the plurality of exhaust manifolds 9 to control air-exhausting from the cylinder 3. Note that an ignition plug is not shown but is placed near a fuel injection valve 11a or 11b.

The fuel injection valve is placed such that, as shown in FIG. 1, in a center-mount configuration, the fuel injection valve 11a is placed on the top of the cylinder head 3a or, in a side-mount configuration, the fuel injection valve 11b is placed on the upper portion of the cylinder 3. The embodiment is described below in connection to the fuel injection valve in the side-mount configuration. However, the invention is also applicable to the fuel injection valve in the center-mount configuration. In the state shown in FIG. 1, with the intake valve 7a opened and the exhaust valve 9a closed, air intaken from the intake manifold 7 forms a tumble flow (vertical vortex flow) T in the cylinder 3. Furthermore, in FIG. 1, a ring-shaped space T1 that virtually includes a ring of the tumble flow T is assumed. The ring-shaped space T1 has a center axis that is not shown but is perpendicular to the sliding direction of the piston.

Figure 2:
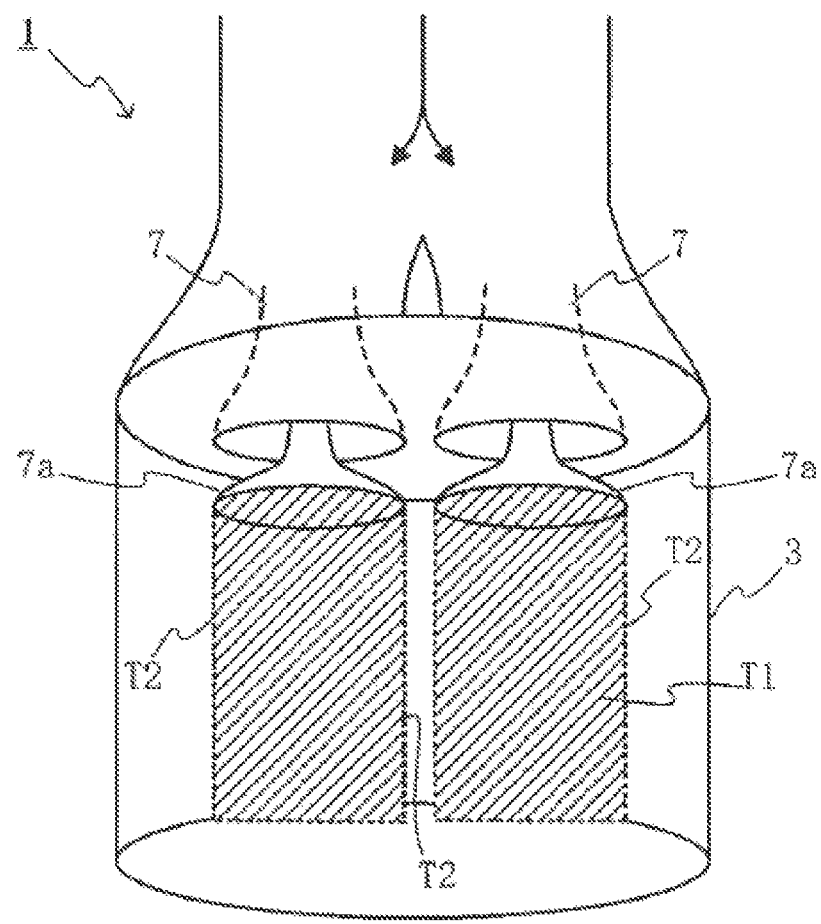
FIG. 2 is a schematic diagram viewing the internal combustion engine in FIG. 1 from the direction of an arrow A in FIG. 1.
Figure 8:
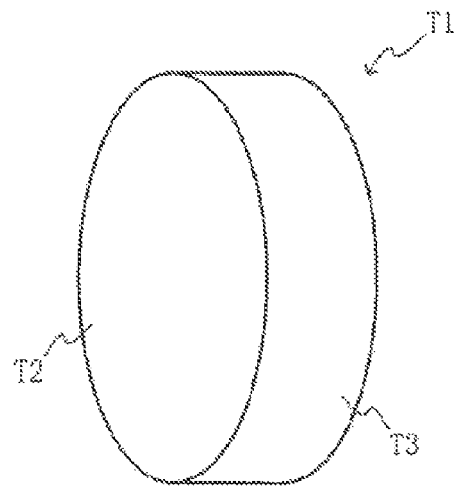
FIG. 8 is a perspective view showing the 3D shape of the space T1 of FIG. 1.

FIG. 2 is a conceptual diagram viewing the cylinder 3 from the direction of an arrow A in FIG. 1. In FIG. 2, the exhaust manifold 9, the exhaust valve 9a and the fuel injection valve 11a or 11b are not shown. The diagonally shaded areas in FIG. 2 indicate the spaces T1 in which the tumble flow is strongly formed. The two spaces T1 are formed in a ring shape (disc shape) corresponding to the two intake manifolds 7. The two spaces T1 are aligned in parallel to each other with an area of weak flow formed in between. Note that, as shown in FIG. 8, the space T1 includes a circular plane T2 and a ring-shaped curved surface T3, being virtually disc-shaped.

In the embodiment, as shown in FIGS. 1 and 2, the tumble flow is included in the ring-shaped space that rotates in a vertical direction, and the individual injection holes of the fuel injection valve in accordance with the invention generally inject fuel toward and so as to be hit by the ring-shaped curved surface T3 of the ring-shaped space T1.

Figure 3:
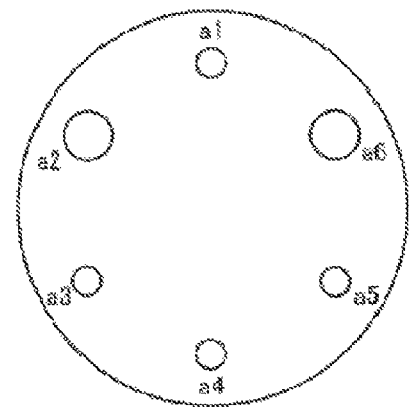
FIG. 3 is a plan view showing the shape of injection holes applicable to a fuel injection valve in accordance with the invention.
Figure 3:
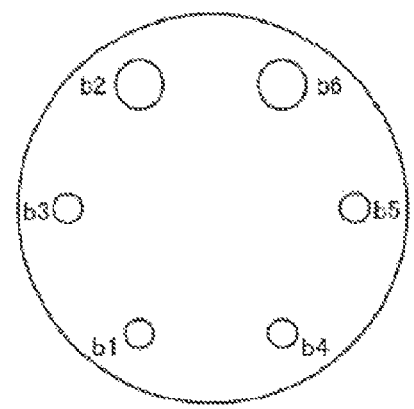
Figure 3:
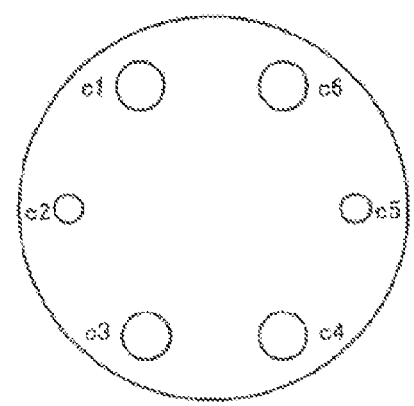

FIG. 3 is a conceptual diagram of the injection surface of an injection nozzle of the fuel injection valve 11a or 11b in accordance with the embodiment. The injection surface of the injection nozzle includes a plurality of injection holes placed at equal spaces along the circumference. In the embodiment, fuel is injected from the plurality of injection holes at the same time. In the case of FIG. 3(a), the injection holes are placed at the positions corresponding to 12, 2, 4, 6, 8 and 10 o'clock. In this case, injection holes a6 and a2 at the 2 and 10 o'clock positions have a larger diameter, while injection holes a1, a5, a4 and a3 at the other four positions have a smaller diameter. In FIG. 3(a), the injection holes a6 and a2 are included in the first group of injection holes and the injection holes a1, a5, a4 and a3 are included in the second group of injection holes.

In the case of FIG. 3(b), the injection holes are placed at the 1, 3, 5, 7, 9 and 11 o'clock positions. In this case, injection holes b2 and b6 at the 1 and 11 o'clock positions have a larger diameter, while injection holes b1, b3, b4 and b5 at the other four positions have a smaller diameter. In FIG. 3(b), the injection holes b2 and b6 are included in the first group of injection holes and the injection holes b1, b3, b4 and b5 are included in the second group of injection holes.

Figure 9:
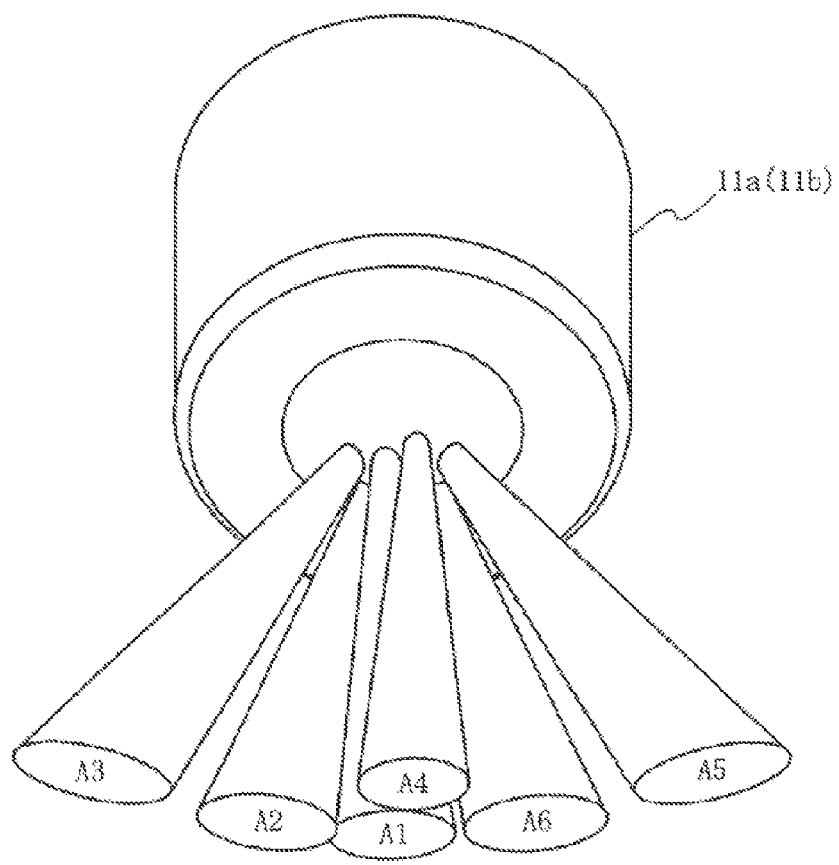
FIG. 9 is a perspective view showing an unsymmetrical fuel spray from the fuel injection valve in accordance with the invention.

In the case of FIG. 3(c), the injection holes are placed at the 1, 3, 5, 7, 9 and 11 o'clock positions. In this case, injection holes c6, c4, c3 and c1 at the 1, 5, 7 and 11 o'clock positions have a larger diameter, while injection holes c2 and c5 at the other two positions have a smaller diameter. In FIG. 3(c), the injection holes c6, c4, c3 and c1 are included in the first group of injection holes and the injection holes c2 and c5 are included in the second group of injection holes. Note that in the examples shown in FIGS. 3(a) and 3(c), the spray directions from the injection holes are symmetrical, and in the example shown in FIG. 3(b), the spray directions from the injection holes are unsymmetrical such that they are crossing in 3D space (i.e., they are skewed). However, the invention is not limited to the above and may include any symmetrical and/or unsymmetrical spray directions. In one example of such an unsymmetrical fuel spray, as shown in FIG. 9, an enlarged perspective view of a fuel injection valve, spray areas A1 and A4 are formed at skewed positions with respect to two injection holes of the fuel injection valve 11a (11b).

Figure 4:
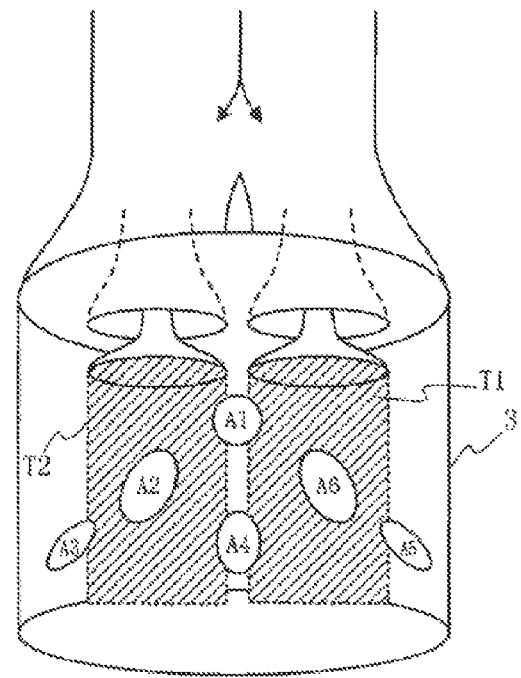
FIG. 4 is a schematic diagram viewing the internal combustion engine in accordance with a first embodiment of the invention from the direction of the arrow A.

FIG. 4 shows spray areas formed corresponding to the layouts of injection holes in FIGS. 3(a) and 3(b). FIG. 4 is a schematic diagram viewing the cylinder 3 from the same direction as that of FIG. 2. The injection holes a2 and a6 having the larger diameter in FIG. 3(a) correspond to injection areas A2 and A6 in FIG. 4. The injection holes a1, a5, a4 and a3 having the smaller diameter in FIG. 3(a) correspond to injection areas A1, A5, A4 and A3 in FIG. 4. As shown in FIG. 4, toward the areas A2 and A6 of strong tumble flow, fuel is injected with a larger penetration from the larger-diameter injection holes a2 and a6, while, toward the areas A1, A4, A3 and A5 of weak tumble flow, fuel is injected with a smaller penetration from the smaller-diameter injection holes a1, a4, a3 and a5.

The injection holes b2 and b6 having the larger diameter in FIG. 3(b) correspond to the injection areas A2 and A6 in FIG. 4. The injection holes b1, b3, b4 and b5 having the smaller diameter in FIG. 3(b) correspond to the spray areas A1, A3, A4 and A5 in FIG. 4. As shown in FIG. 4, toward the areas A2 and A6 of strong tumble flow, fuel is injected with a larger penetration from the larger-diameter injection holes b2 and b6, while, toward the areas A1, A4, A3 and A5 of weak tumble flow, fuel is injected with a smaller penetration from the smaller-diameter injection holes b1, b4, b3 and b5.

Figure 5:
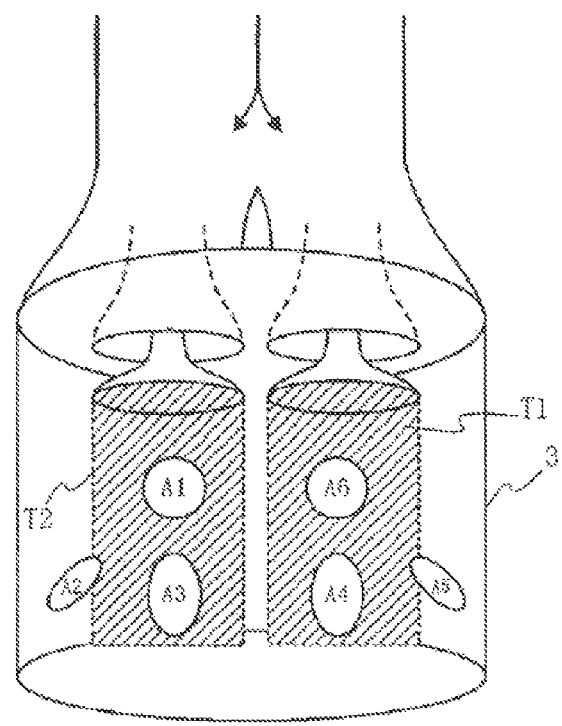
FIG. 5 is a schematic diagram viewing the internal combustion engine in accordance with a second embodiment of the invention from the direction of the arrow A.

FIG. 5 shows a injection area formed corresponding to the layout of injection holes in FIG. 3(c). FIG. 5 is a schematic diagram viewing the cylinder 3 from the same direction as that of FIG. 2. The injection holes c1, c3, c6 and c4 having the larger diameter in FIG. 3(c) correspond to the injection areas A1, A3, A6 and A4 in FIG. 5. The injection holes c2 and c5 having the smaller diameter in FIG. 3(c) correspond to the spray areas A2 and A5 in FIG. 5. As shown in FIG. 5, toward the areas A1, A3, A4 and A6 of strong tumble flow, fuel is injected with a larger penetration from the larger-diameter injection holes c1, c3, c4 and c6, while, toward the areas A2 and A5 of weak tumble flow, fuel is injected with a smaller penetration from the smaller-diameter injection holes c2 and c5.

Figure 6:
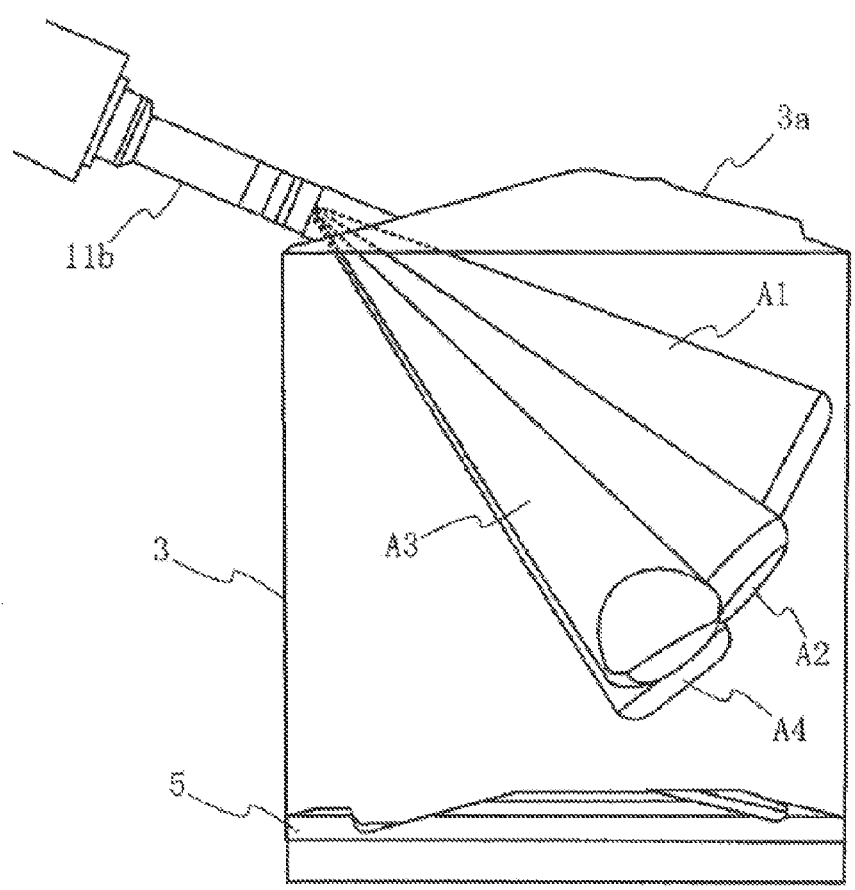
FIG. 6 is a schematic view showing the shape of a fuel spray in the internal combustion engine of FIG. 4.
Figure 7:
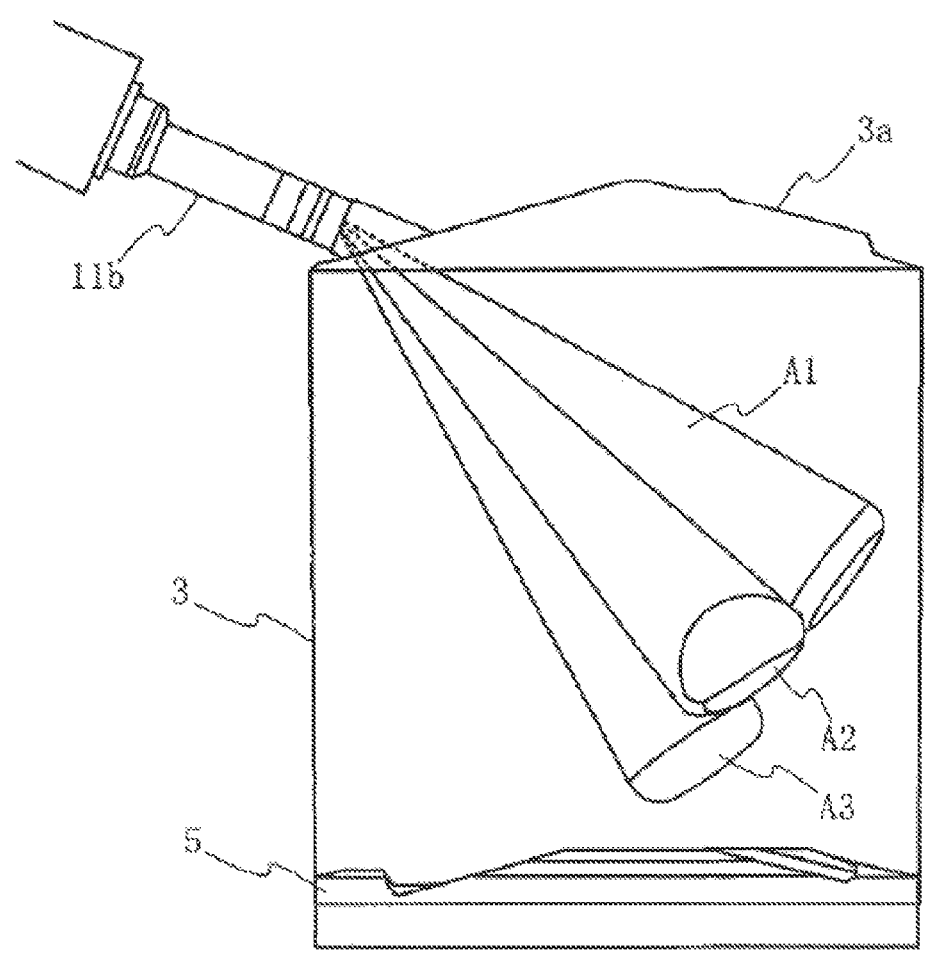
FIG. 7 is a schematic view showing the shape of a fuel spray in the internal combustion engine of FIG. 5.

FIG. 6 is a side view of FIG. 4 for showing a fuel injection shape of FIG. 4. In FIG. 6, tumble flow is not shown. The area A2 shown in FIG. 6 indicates a fuel spray shape with a high flow rate and the larger penetration against tumble flow. FIG. 7 is a side view of FIG. 5 for showing a fuel injection shape of FIG. 5. In FIG. 7, tumble flow is not shown. The areas A1 and A3 shown in FIG. 7 indicate a fuel spray shape with a high flow rate and the larger penetration against tumble flow. As shown in FIGS. 6 and 7, the fuel spray shape is generally a conical shape as a whole (a plurality of conical shapes) and each individual conical shape includes an injection center axis line (not shown). The injection center axis line of the shape of the area A3 (A5) shown in FIGS. 4 and 6 has a maximum angle with the circular plane T2 included in the space T1 in comparison with the injection center axis lines of the other shape of the areas A1, A4, A2 and A6. The injection center axis line of the shape of the area A2 (A5) shown in FIGS. 5 and 7 has a maximum angle with the circular plane T2 included in the space T1 in comparison with the injection center axis lines of the other shape of the areas A1, A3, A4 and A6.

In the embodiment of the invention, the fuel injection valve including the plurality of injection holes having different diameters is described. However, since only penetration for each injection hole needs to be controllable, a different injection speed for each injection hole may be used rather than a different injection hole diameter, for example.

The fuel injection valve of the invention sprays fuel with a relatively larger penetration toward the space T1 including a vortex center of tumble flow, while spraying fuel with a relatively smaller penetration toward a space including around the space T1. Note that the cylinder head 3a of the embodiment is structured to have two intake ports. In this structure, as shown in FIG. 2, in a central area between the spaces T1 including two tumble flows in the cylinder, the flow is relatively weak, and, in the both sides of the central area, the flow is relatively strong, so relatively strongly spraying fuel toward the spaces T1 on the both sides of the central area avoiding the central area is effective.

In the embodiment, since it is necessary to maintain constant the total penetration of the fuel injection valve, the increase in the penetration of the first group of injection holes is set as follows so as to correspond to the decrease in the penetration of the second group of injection holes.

An average opening area is calculated from the total opening area of all of the plurality of injection holes. A first average opening area is calculated by multiplying the number of injection holes of the first group of injection holes by the average opening area. A second average opening area is calculated by multiplying the number of injection holes of the second group of injection holes by the average opening area. The increase in the area obtained by subtracting the first average opening area from the total opening area of the first group of injection holes is set so as to correspond to the decrease in the area obtained by subtracting the total opening area of the second group of injection holes from the second average opening area. Furthermore, the increase in the area and the decrease in the area may be 20-40% of the total opening area of all of the plurality of injection holes.

Furthermore, the embodiment includes the first group of injection holes having the same larger diameter and the second group of injection holes having the same smaller diameter, but the invention is not limited to such a grouping. For example, the first and second groups of injection holes may include injection holes having individually different diameters, and the diameter of an injection hole having the smallest diameter in the first group may be larger than the diameter of an injection hole having the largest diameter in the second group. In this case, a fuel spray with the smallest penetration force from the first group of injection holes has a penetration force larger than a fuel spray with the largest penetration force from the second group of injection holes.

The invention is independent of the rotation direction of tumble flow in contrast to JP-A-2004-232583. So, the direction of fuel spray of the invention is applicable to any of forward tumble flow and reverse tumble flow. In short, the invention is not intended to leverage tumble flow, but intended to control injection so that large amount of fuel is injected to an area of strong tumble flow. Furthermore, the invention is applicable to both homogeneous combustion and stratified charge combustion.

According to the invention, a fuel spray with an increased penetration is caused to interfere with strong intake flow into the cylinder to promote evaporation of fine particles, thereby significantly reduce fuel adhesion onto the wall surface due to the fuel spray with increased penetration.

Note that, even when a penetration is increased for an area of strong tumble flow, the fuel spray cannot penetrate the area due to high air fluidity, which can prevent fuel adhesion onto the cylinder liner. On the other hand, when a penetration is decreased for an area of weak tumble flow, overall fuel spray travel distance will decrease, which can prevent fuel adhesion onto the cylinder liner and the piston crown surface.

REFERENCE SIGNS LIST 1 internal combustion engine
3 cylinder
3a cylinder head
5 piston
7 intake manifold
7a intake valve
9 exhaust manifold
9a exhaust valve
11a, 11b fuel injection valve
T tumble flow
T1 space
T2 circular plane
a1-a6 injection hole
b1-b6 injection hole
c1-c6 injection hole
A1-A6 spray area

What is claimed is:

1. A fuel injection valve that has a plurality of injection holes and injects fuel into a cylinder of an internal combustion engine, comprising:
   a first group of injection holes for injecting fuel toward a plurality of cylindrical spaces each including an area of strong tumble flow formed in the cylinder; and a second group of injection holes for injecting fuel toward a space that is between the plurality of cylindrical spaces and that includes an area of weak tumble flow formed in the cylinder,
   wherein a fuel spray with a smallest penetration force from the first group of injection holes has a penetration force larger than a fuel spray with a largest penetration force from the second group of injection holes.

2. The fuel injection valve according to claim 1, wherein the first group of injection holes includes an injection hole having an injection center axis line having a minimum angle with a circular plane including a ring of the space.

3. The fuel injection valve according to claim 1, wherein the second group of injection holes includes an injection hole having an injection center axis line having a maximum angle with a circular plane including a ring of the space.

4. The fuel injection valve according to claim 1, wherein a smallest injection hole of the first group of injection holes has a diameter larger than that of a largest injection hole of the second group of injection holes.

5. The fuel injection valve according to claim 1, wherein a plurality of spaces are formed, and the second group of injection holes inject fuel toward a space of weak tumble flow formed between and outside the plurality of spaces.

6. The fuel injection valve according to claim 1, wherein a plurality of spaces are formed, and the second group of injection holes inject fuel toward a space of weak tumble flow formed outside the plurality of spaces.

7. The fuel injection valve according to claim 5, wherein the second group of injection holes includes an injection hole having an injection center axis line having a maximum angle with a circular plane including a ring of the space.

8. The fuel injection valve according to claim 5, wherein the second group of injection holes includes an injection hole having an injection center axis line having a minimum angle with a circular plane including a ring of the space.

9. The fuel injection valve according to claim 1, wherein in order to maintain constant a total injection amount of the fuel injection valve, an increase or decrease in the total injection amount of the fuel injection valve calculated by combining an increase or decrease in the injection amount of all of the injection holes is zero.

10. An internal combustion engine comprising the fuel injection valve according to claim 1.

11. A fuel injection method for injecting fuel into a cylinder of an internal combustion engine using a fuel injection valve that has a plurality of injection holes; comprising:
    a first injection step for injecting fuel from a first group of injection holes toward a plurality of spaces each including an area of strong tumble flow formed in the cylinder; and
    a second injection step for injecting fuel from a second group of injection holes toward a space that is between the plurality of spaces and that includes an area of weak tumble flow formed in the cylinder,
    wherein a fuel spray with a smallest penetration force from the first group of injection holes has a penetration force larger than a fuel spray with a largest penetration force from the second group of injection holes.

12. The fuel injection method according to claim 11, wherein the first group of injection holes includes an injection hole having an injection center axis line having a minimum angle with a circular plane including a ring of the space.

13. The fuel injection method according to claim 11, wherein the second group of injection holes includes an injection hole having an injection center axis line having a maximum angle with a circular plane including a ring of the space.

14. The fuel injection method according to claim 11, wherein the first injection step and the second injection step are performed at the same time.

15. The fuel injection method according to claim 11, wherein a plurality of spaces are formed, and the second group of injection holes inject fuel toward a space of weak tumble flow formed between and outside the plurality of spaces.

16. The fuel injection method according to claim 11, wherein a plurality of spaces are formed, and the second group of injection holes inject fuel toward a space of weak tumble flow formed outside the plurality of spaces.

17. The fuel injection method according to claim 15, wherein the second group of injection holes includes an injection hole having an injection center axis line having a maximum angle with a circular plane including a ring of the space.

18. The fuel injection method according to claim 15, wherein the second group of injection holes includes an injection hole having an injection center axis line having a minimum angle with a circular plane including a ring of the space.

\* \* \* \* \*